United States Patent [19]
Nepper et al.

[11] 3,764,156
[45] Oct. 9, 1973

[54] MOUNTING DEVICE FOR SECURING A HANDLE TO A LAWN MOWER

[75] Inventors: John P. Nepper; Joseph J. Lane; Juris Skuja, all of Omaha, Nebr.

[73] Assignee: Arctic Enterprises, Inc., Thief River Falls, Minn.

[22] Filed: Feb. 1, 1972

[21] Appl. No.: 222,608

[52] U.S. Cl......... 280/47.37, 56/DIG. 18, 16/111 A
[51] Int. Cl............................................. B62b 11/00
[58] Field of Search...................... 280/47.37, 47.38, 280/47.36; 16/111 A, 111 R, 112; 56/DIG. 18

[56] References Cited
UNITED STATES PATENTS

| | | | |
|---|---|---|---|
| 2,763,492 | 9/1956 | Phelps | 280/47.36 |
| 1,686,934 | 10/1928 | Serva | 280/47.37 R |
| 2,645,808 | 7/1953 | Rosenberg | 16/111 A |

*Primary Examiner*—Robert R. Song
*Attorney*—Donald J. Koprowski

[57] ABSTRACT

A mounting device for securing a handle to a lawn mower, or other deck or housing structure, includes a simple lever means interposed between a terminal end portion of the handle and an upstanding bracket in such a way that the handle can be urged away from the bracket for purposes of adjusting the angular position of the handle relative to the bracket. The terminal end of the handle includes a pair of projecting pins, one of which functions to fix the pivot axis of the handle, and the other of which functions to lock the handle into a selected angular position.

11 Claims, 9 Drawing Figures

PATENTED OCT 9 1973 3,764,156
SHEET 1 OF 2
*Fig. 1.*
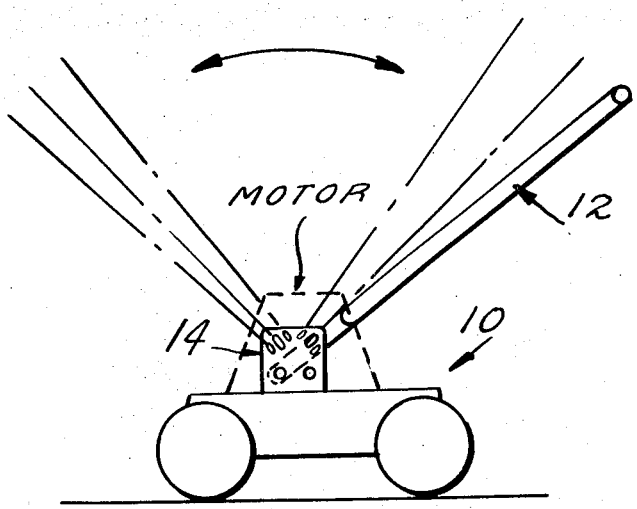
*Fig. 2.*
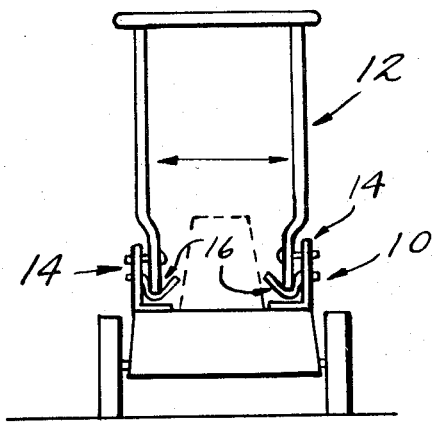
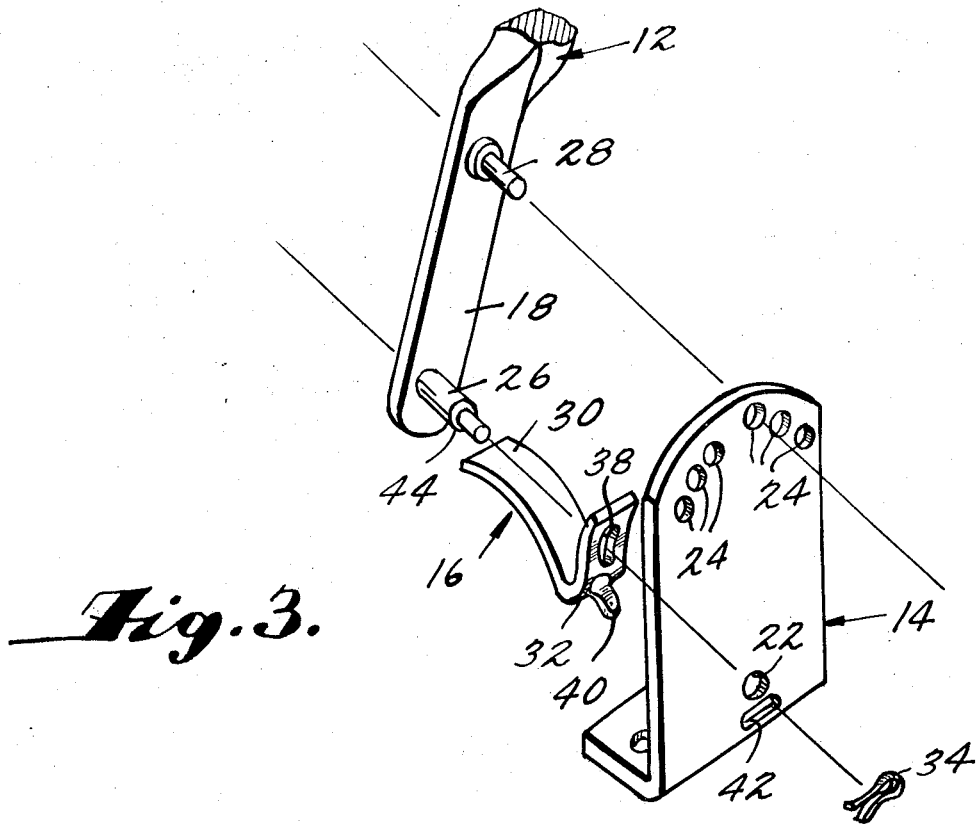
*Fig. 3.*

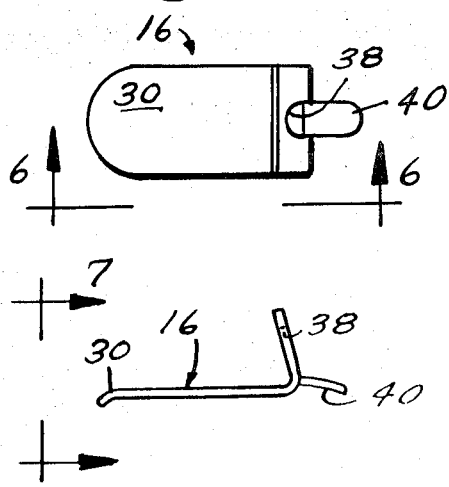
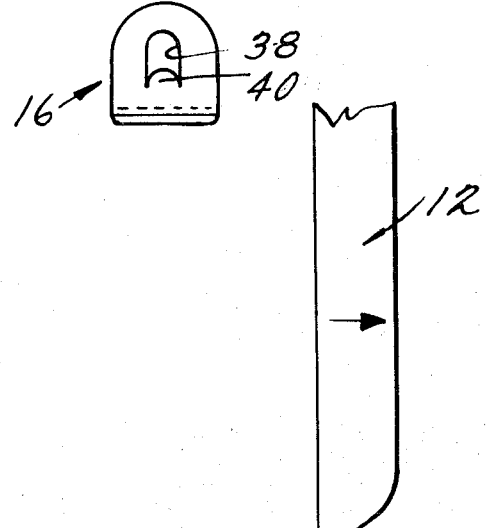
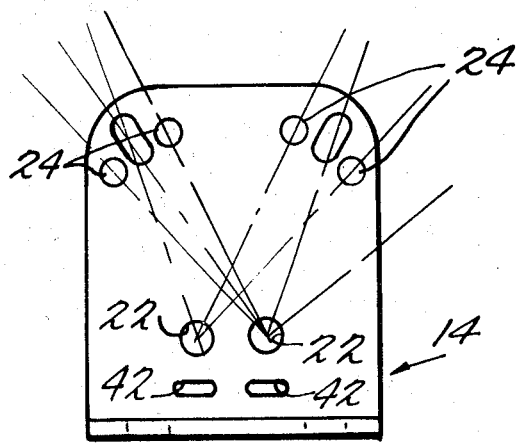
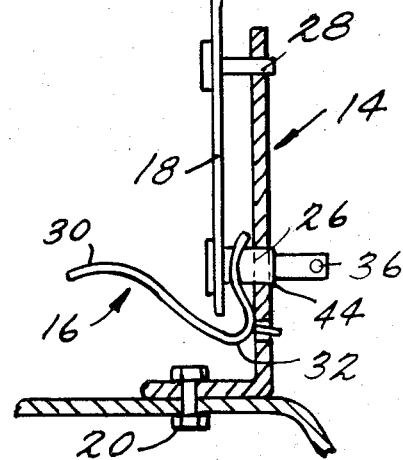
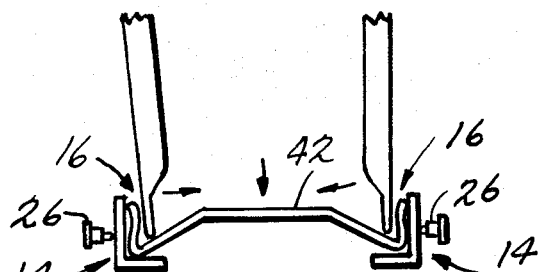

MOUNTING DEVICE FOR SECURING A HANDLE TO A LAWN MOWER

BACKGROUND AND BRIEF DESCRIPTION OF INVENTION

The present invention relates to an improved mounting device for mounting a handle assembly for adjustable movement to different angular positions relative to a deck or housing structure. More specifically, the invention is concerned with a mounting device useful for attachment to handle assemblies of lawn mowers, or similar pieces of equipment, and which provides for a range of adjustable positioning and locking of the handle assembly relative to the lawn mower or other equipment.

It is known in this art to mount a lawn mower handle assembly to the deck or housing structure of a lawn mower by the use of various forms of brackets which permit adjustment of the handle assembly about a pivotal axis. Further, it is known to provide for a range of adjusted positions into which the handle can be locked so that the lawn mower can be safely used without danger of accidental tilting of the handle out of a selected position. The present invention is directed to an improved mounting device for providing such adjustment and locking features for a handle means relative to a deck or housing structure to which the handle means is to be secured. The device of the present invention is relatively simple for low cost manufacture, easily actuated and used without a requirement for special tools or other devices, and safe in its securement of a handle means to another structure.

In its basic form, the mounting device of the present invention includes (a) bracket means which can be fastened to a deck or housing structure so as to provide upstanding surfaces against which the lower terminal ends of a handle means can be pivotally secured for selective adjustment to different angular positions relative to the deck or housing, and (b) lever means which can be mounted on the pivot axis of the handle means secured to the bracket means. One lever means is interposed between each bracket means and a lower terminal end of the handle means so that an application of force to the lever means results in an urging of the terminal end portion of the handle means away from its associated bracket means for a sufficient distance to allow movement of the handle means, about its pivot axis, to a selected angular position in which it can be locked. The handle means is provided with first and second projecting means at each of its terminal end portions. The first projecting means is received in a first aperture of an associated bracket means to define a fixed pivot axis of the handle means relative to the bracket means. This projecting means may be in the form of a pivot pin. The second projecting means is received in one of a series of second apertures of the bracket means for setting and locking the angular position of the handle means relative to a deck or housing. The second projecting means may be in the form of a pin which functions as a locking pin.

One of the features of the present invention is a provision for a relatively simple lever device which can be easily manufactured and installed in this type of assembly for providing positive control of a handle means when the handle means is to be adjusted and locked into a selected angular position. Many prior art arrangements have provided for mounting brackets which receive one or more projecting pins from the terminal end of a handle assembly, as shown in U. S. Pat. No. 2,716,559 for example, but such prior art arrangements have required a manual removal of the handle assembly from its mounted position in order to effect a change in angular position. This requirement results in inconvenience in use and possible danger from pinching or cutting while attempting adjustment with the working elements of the mounting assembly. Other prior art arrangements have provided for a safer fixing of the pivotal axis of a handle means relative to a lawn mower, as shown for example, in U. S. Pat. No. 2,791,437, but the range of available angular positions, ease of manufacture, assembly, and use are somewhat limited when compared to the safe securement and wide range of adjustments offered by the mounting device of the present invention. The lever means of the present invention can be easily actuated by foot or hand pressure in a safe and reliable way to disengage a locking pin of the handle means out of a selected position, and disengagement can be easily maintained until a new angular position is selected. Such disengagement does not remove the pivot pin of the handle means from its secured position during simple adjustment in angle. The lever means can be manufactured at low cost from a stamping from a single sheet of material, and it is designed to be easily assembled onto the pivot pin of a handle means in such a way that it will not dislodge or move out of place during adjustment movements of the handle means.

Thus, the present invention provides for a relatively rigid mounting bracket which safely secures a handle for a number of selected positions without a requirement for disassembly or use of special tools to effect a change in position. The lever means which is used to disengage the handle means from a selected position can be easily operated by foot or hand pressure, and there is no requirement for a use of spring devices or other collateral equipment to make the assembly operational. Furthermore, the pivot axis of the handle can be fixed and maintained for all adjustment movements of the handle without danger of the handle means being removed from its mounting brackets.

Additional known prior art on this subject includes U. S. Pat. Nos. 187,455; 484,938; 521,252; 616,925; 2,107,095; 2,254,667; 2,463,082; 2,601,999; 2,617,670; 2,722,104; 2,932,537; and 3,485,018.

These and other features and advantages of the present invention will become apparent in the more detailed discussion which follows, and in that discussion reference will be made to the accompanying drawings as briefly described below.

BRIEF DESCRIPTION OF DRAWINGS

FIG. 1 is a schematic view, in side elevation, of a lawn mower device having an adjustable handle means secured thereto with the mounting device of the present invention;

FIG. 2 is a schematic view, in end elevation, of the same lawn mower device as shown in FIG. 1;

FIG. 3 is an exploded perspective view of basic components making up the mounting device of the present invention, shown in greatly enlarged view from what is shown in FIGS. 1 and 2;

FIG. 4 is an end elevational view, partly in section, of the components shown in FIG. 3 as they would be seen in assembled condition;

FIG. 5 is an enlarged top plan view of a form of lever means which may be used with the mounting device of the present invention;

FIG. 6 is a side view of the FIG. 5 lever means, as seen on line 6—6 of FIG. 5;

FIG. 7 is an end view of the lever means of FIGS. 5 and 6, as seen on line 7—7 of FIG. 6;

FIG. 8 is a side elevational view of a bracket means used in combination with other elements for mounting device of the present invention; and FIG. 9 is a schematic view, in end elevation, of a modified mounting device in accordance with this invention.

DETAILED DESCRIPTION OF INVENTION

FIGS. 1 and 2 schematically illustrate a preferred application of the principles of the present invention. As shown, a lawn mower device 10, which may be of any type or form, is provided with a handle means 12 which can be adjusted through a wide range of angular positions relative to the lawn mower 10. A typical range of positions is indicated by the full and dashed lines of FIG. 1. The handle means 12 is secured to the deck or housing structure of the lawn mower by a pair of bracket means 14, and other associated structures which will be explained in greater detail below, at each terminal end of the illustrated handle means 12. The handle means 12 is structured and designed to normally urge its terminal ends outwardly (in the directions of the double-headed arrow shown in FIG. 2) when secured between the two mounting brackets 14. However, other means may be provided for normally urging the terminal ends of the handle means towards mounting surfaces of associated bracket means, if desired. As generally shown in FIG. 2, lever means 16 are positioned to be carried between the terminal ends of the handle means 12 and their associated bracket means so that the lever means 16 can function to urge the terminal ends away from the bracket means when a change in angular position of the handle means 12 is to be effected.

FIGS. 3 and 4 illustrate details of a single mounting device of the present invention as associated with a single terminal end portion of the type of handle means 12 shown in FIG. 2. It is to be understood that two such mounting devices are utilized in a typical mounting arrangement for a lawn mower handle means. Each mounting device includes a bracket means 14 which can be fastened to a deck or housing so as to provide an upstanding surface against which a terminal end portion 18 of the handle means 12 can be pivotally secured for selective adjustment to different angular positions relative to the deck or housing. FIG. 4 shows the bracket means 14 secured to the deck structure of a lawn mower by a conventional nut and bolt assembly 20. Each bracket means includes a first aperture 22 located at an intended pivot axis of the handle means 12 when it is secured to the bracket means. More than one such pivot axis location may be provided, as suggested in the modified bracket means shown in FIG. 8. In addition, each bracket means includes a series of second apertures 24 which define locking positions for a range of angular positions of the handle means 12 relative to the bracket means 14. Any suitable number and spacing of the second apertures 24 may be provided, and the apertures may be of a special form, as shown in FIG. 8, to accommodate more than one pivotal axis position for the handle means relative to the bracket means.

The terminal end portion 18 of the handle means 12 is provided with first and second projecting means 26 and 28, respectively. The first and second projecting means 26 and 28 are shown in the form of pins secured to a face of the terminal end portion 18 so as to project outwardly from a common side of the end portion in spaced positions. The first projecting means 26 functions as a pivot pin which can be received in the first aperture 22 of the bracket means 14 for defining a fixed pivot axis for the handle means 12. The second projecting means 28 functions as a locking pin which can be received in one of the second apertures 24 of the bracket means 14.

The lever means 16 is assembled between the terminal end portion 18 of the handle means 12 and the bracket means 14 so as to provide an extended portion 30 which can be pressed to rock the lever means about its fulcrum portion 32. This urges the terminal end portion of the handle means away from the bracket means for a sufficient distance to move the second projecting means 28 out of engagement with one of the second apertures 24. Sufficient pressure is applied to the extended portion 30 of the lever means 16 to overcome the normal bias of the handle means 12 towards its associated bracket means 14.

FIG. 4 illustrates the general relationship of components of the mounting device when the handle means 12 is locked into a selected angular position. In such position, the projecting means 28 extends through the bracket means 14, and the handle means cannot be dislodged from the selected position. A spring bias of the handle means 12, in the direction of the arrow in FIG. 4, maintains this relationship. When it is desired to effect an adjustment of the handle means, the extended portion 30 of the lever means 16 is pressed downwardly, as viewed in FIG. 4, and this movement urges the terminal end portion 18 of the handle means away from (to the left in the FIG. 4 view) the bracket 14. This movement can continue until a limit position is reached, as determined by a cotter pin 34 (see FIG. 3) secured in an end opening 36 of the first projecting means 26. When this limit position is reached, the second projecting means 28 will be completely disengaged from the bracket means 14, but there will be no corresponding disengagement of the first projecting means 26 from its securement to the bracket means 14. Thus, the pivot pin (first projecting means 26) of the handle means is maintained in a secured position without danger of complete removal even though it is shifted relative to the bracket means to which it is secured. Once the locking pin (second projecting means 28) is out of engagement with the bracket means, and assuming that a similar disengagement is applied to an opposite mounting bracket in the typical lawn mower assembly having two such mounting devices, the handle means 12 can then be moved to a newly selected position. When a selected position is reached, the locking pin 28 can be allowed to re-engage one of the apertures 24.

For ease of assembly, the lever means 16 is provided with an aperture 38 which permits an end of the lever means 16 to be fitted over the first projecting means 26. This prevents a loss or dislodgement of the lever means once the assembly is completed and a cotter pin 34, or similar device, is installed. In addition, the lever means 16 is preferably provided with a tab element 40 which can be received into a third aperture 42 of the bracket means 14 for fixing the position of the lever means and preventing its rotation during adjustment of the handle means. The tab element 40 may be cut out of the main body of the material from which the lever means 16 is formed.

A further feature of the present invention is a provision for maintaining disengagement of the lower terminal end 18 of the handle means during adjustment movements of the handle means. This is provided by a shoulder formation 44 formed on the first projecting means 26. When the lower terminal end 18 of the handle means is urged away from the bracket means 14, a point will be reached at which the first projecting means 26 can shift slightly out of its axis, through normal adjustment movements applied to the handle means, to cause the shoulder 44 to bear against an inside surface of the bracket means 14. Once this happens, it is not necessary to maintain pressure on the lever means 16 during adjustment of the handle means 12, and when a new angular position has been selected for the handle means 12, a slight jogging of the handle means will cause the pivot pin 26, and the locking pin 28, to move back into engagement with their respective apertures in the bracket means 14.

FIGS. 5 – 7 illustrate details of a lever means 16 having a slightly different shape and structure from the one shown in FIGS. 3 and 4. The tab element 40 is of sufficient size to provide the required aperture 38 when the tab element is cut out and bent away from the main body of the lever means 16.

FIG. 8 illustrates a modified bracket means 14 having two separate apertures 22 for fixing a preferred pivot axis for a handle means. Each aperture 22 includes an associated aperture 42 for receiving the tab element 40 of the lever means 16, depending upon which position is selected for the pivot axis of the handle means.

It can be appreciated that the components of the mounting device of this invention are relatively simple and easily manufactured at low cost. The lever means can be stamped from suitable sheet metal material which provides requisite strength for the finished form of the lever means. The bracket means 14 can be formed from a very rigid and high strength metal material for rigid securement to the deck of a lawn mower. The projecting means 26 and 28 are fastened in fixed positions to the lower terminal ends of the handle means in any conventional and suitable manner to provide a safe and reliable structure.

As shown in FIG. 9, the basic arrangement can be modified to provide for simultaneous actuation of a pair of lever means 16. This can be accomplished by interconnecting lever means from opposite sides of the assembly by an actuating member of linkage 42 so that a downward force on the actuating member will cause both lever means to urge the terminal end portions of the handle assembly inwardly. The interconnecting portion may be formed as an integral structure with the two lever means or it may comprise a separate linkage or tension member secured to the lever means in a known manner. The FIG. 9 representation is schematic, and it is to be understood that the interconnecting portion (actuating member 42) would be suitably shaped to provide clearance of the motor housing of the lawn mower.

What is claimed is:

1. A mounting device for securing a handle means for adjustable movement to different angular positions relative to a deck or housing structure, comprising
    a bracket means which can be fastened to a deck or housing so as to provide an upstanding surface against which an end of a handle means can be pivotally secured for selective adjustment to different angular positions relative to the deck or housing, said bracket means including (a) a first aperture located at a pivot axis of a handle means secured to the bracket means, and (b) a series of second apertures which define locking positions for a range of angular positions of the handle means relative to the bracket means,
    a handle means having a terminal end portion to be secured to said bracket means,
    first and second projecting means carried by said terminal end portion of the handle means, said first and second projecting means being spaced apart and projecting toward said bracket means from a common side of said terminal end portion so that the first projecting means can be received in said first aperture of the bracket means to define a pivot axis of the handle means relative to the bracket means, and the second projecting means can be received in one of the apertures of said series of second apertures,
    a lever means mounted on said pivot axis, said lever means having an extended portion which can be actuated to urge the terminal end portion of the handle means away from said bracket means for a sufficient distance to move said second projecting means out of engagement with one of said second apertures without moving said first projecting means out of engagement with said first aperture, and
    means for normally biasing said terminal end portion of the handle means towards said bracket means.

2. The device of claim 1 wherein said lever means includes an aperture formed through an end opposite to said extended portion so that the lever means can be mounted on said first projecting means in a portion between the handle means and the bracket means.

3. The device of claim 1 and including:
    third aperture means formed in the bracket means for receiving a portion of said lever means so that the lever means will not be displaced out of position during adjustment of the handle means.

4. The device of claim 3 wherein said portion of said lever means comprises a tab element cut out of the main body of said lever means.

5. The device of claim 1 wherein said lever means is formed from a single piece of material which is shaped to define a fulcrum portion intermediate its ends.

6. The device of claim 1 wherein said bracket means includes more than one first aperture for receiving said first projecting means of the handle means, thereby providing for a mounting of the handle means at selected pivot axes.

7. The device of claim 1 wherein said first and second projecting means comprise pin means secured to said handle means.

8. The device of claim 7 wherein said first projecting pin means includes a shoulder means which limits immediate return movement of the handle means towards said bracket means when the lever means has been actuated and the handle means is being adjusted to a new position.

9. The device of claim 8 wherein said shoulder means is defined on said first projecting pin means by a reduced diameter terminal end portion on the pin means.

10. The device of claim 1, and including means for limiting movement of said handle means away from said bracket means.

11. The device of claim 1 wherein separate lever means are provided at opposite sides of the handle assembly and wherein said lever means are interconnected with each other by a member which can be used to actuate both lever means simultaneously.

* * * * *